United States Patent
Bauers

(10) Patent No.: US 9,938,647 B2
(45) Date of Patent: Apr. 10, 2018

(54) USE OF BINDER COMPOSITIONS FOR PRODUCING TEXTILE SHEET PRODUCTS

(71) Applicant: Wacker Chemie AG, München (DE)

(72) Inventor: Florian Bauers, Burghausen (DE)

(73) Assignee: Wacker Chemie AG, Munich (DE)

( * ) Notice: Subject to any disclaimer, the term of this patent is extended or adjusted under 35 U.S.C. 154(b) by 47 days.

(21) Appl. No.: 15/034,730

(22) PCT Filed: Nov. 4, 2014

(86) PCT No.: PCT/EP2014/073744
§ 371 (c)(1),
(2) Date: May 5, 2016

(87) PCT Pub. No.: WO2015/067621
PCT Pub. Date: May 14, 2015

(65) Prior Publication Data
US 2016/0258091 A1 Sep. 8, 2016

(30) Foreign Application Priority Data
Nov. 8, 2013 (DE) .................. 10 2013 222 770

(51) Int. Cl.
*D06M 15/273* (2006.01)
*D04H 1/587* (2012.01)
*D06M 15/356* (2006.01)
*C09J 131/04* (2006.01)

(52) U.S. Cl.
CPC ............ *D04H 1/587* (2013.01); *C09J 131/04* (2013.01); *D06M 15/273* (2013.01); *D06M 15/3568* (2013.01)

(58) Field of Classification Search
CPC ................. D06M 15/273; D06M 15/3568
See application file for complete search history.

(56) References Cited

U.S. PATENT DOCUMENTS

| 4,449,978 A | 5/1984 | Iacoviello |
| 2003/0155681 A1 | 8/2003 | Graewe |
| 2006/0074187 A1 | 4/2006 | Stark |
| 2011/0190462 A1 | 8/2011 | Nogai |
| 2013/0095719 A1 | 4/2013 | Jakob |

FOREIGN PATENT DOCUMENTS

| EP | 1336623 A2 | 8/2003 |
| EP | 2199332 A1 | 6/2010 |
| JP | S5060570 A | 5/1975 |
| JP | 2007247111 A2 | 9/2007 |
| WO | 9952961 A1 | 10/1999 |
| WO | 04065437 A1 | 8/2004 |
| WO | 07120341 A2 | 10/2007 |
| WO | 09024216 A1 | 2/2009 |
| WO | 11131279 A1 | 10/2011 |
| WO | 13072713 A1 | 5/2013 |

OTHER PUBLICATIONS

JP 2007-247111 machine translation original document dated (2007).*
Polymer Handbook 2nd Edition, J. Wiley & Sons, New York (1975).
Abstract for JP S5060570.
Abstract for JP 2007247111.
International Search Report of PCT/EP2014/073744, dated Jan. 27, 2015.

* cited by examiner

*Primary Examiner* — Edward J Cain
(74) *Attorney, Agent, or Firm* — RatnerPrestia

(57) ABSTRACT

The invention relates to the use of binder compositions containing one or more polymers based on ethylenically unsaturated monomers for producing textile sheet products, characterized in that the polymers are based on a) from 0.1 to 10% by weight of one or more ethylenically unsaturated monomers containing epoxy groups, b) from 0.1 to 10% by weight of one or more ethylenically unsaturated monomers containing silane groups and c) one or more other ethylenically unsaturated monomers differing from the monomers a) and b), where the % by weight data are always based on the total weight of the polymers.

10 Claims, No Drawings

USE OF BINDER COMPOSITIONS FOR PRODUCING TEXTILE SHEET PRODUCTS

CROSS-REFERENCE TO RELATED APPLICATIONS

This application is the U.S. National stage filing of International Application No. PCT/EP2014/073744, filed 4 Nov. 2014, and claims priority of German application number 10 2013 222 770.1, filed 8 Nov. 2013, the entireties of which applications are incorporated herein by reference.

FIELD OF THE INVENTION

The invention relates to the use of binder compositions in the manufacture of textile sheet products, for example nonwovens, in particular tissues, felts, waddings or coarse-mesh, loose wovens or knits.

BACKGROUND OF THE INVENTION

Binder compositions for textile sheet products are usually in aqueous form and by way of the binder component generally comprise polymers based on ethylenically unsaturated monomers. Said polymers typically comprise units of crosslinking monomers and therefore are capable of crosslinking with each other and optionally also with fibers and hence of contributing to the formation of textile sheet products of higher strength. This makes it possible to achieve durable fixation of the fibers and also an enhanced ability of the textile sheet products to resist mechanical loading, even on contact with liquids. The textile sheet products known as nonwovens are obtainable by the airlay, wetlay or spunlay process for example.

Polymers comprising N-methylolacrylamide (NMA) units, as described for example in U.S. Pat. No. 4,449,978, have hitherto dominated industrial practice in relation to binder components. Disadvantageously, polymers of this type crosslink with formaldehyde formation, which is deprecated for toxicological reasons. In addition, such polymers often already contain formaldehyde as a concomitant as a consequence of their method of making, for example the use in their polymerization of formaldehyde-releasing initiators, such as sodium formaldehydesulfoxylate (SFS). However, formaldehyde may also be imported through the addition of certain stabilizers.

There is accordingly a need to minimize the formaldehyde content of binder compositions and to provide ideally formaldehyde-free textile sheet products in an efficient manner. WO 2013/072713 proposes mixtures of carboxylic acid/anhydride modified polymers useful as binders. WO 2009/024216 recommends copolymers comprising specific sulfonic acid monomer units for use as binders for various applications. WO 2004/065437 relates to silicone-modified chain growth addition polymers. Proposals for use as binder component also include styrene-butyl acrylate polymers functionalized by, for example, interpolymerization with acrylamide, (meth)acrylic acid or hydroxyethyl acrylate, for example Primal™ NW-1845K. EP2199332 describes binder compositions comprising carboxyl-functionalized styrene-acrylate copolymers and polysaccharides, proteins or lignin/lignosulfonates. Textile sheet products obtained therewith, however, have low rates of wetting, minimal capacities for water absorption or long times to droplet penetration. Moreover, the drying/curing of binder compositions comprising styrene-butyl acrylate polymers requires higher temperatures in the manufacture of textile sheet products and so is more energy-intensive.

WO 2007/120341 and WO 99/52961 recommend the use of blocked polyisocyanates as binders for nonwovens. To cure the nonwovens, the isocyanates are deblocked by detaching the blocking groups, thus generating by-products, and this may for example entail an unwelcome odor nuisance.

In addition, prior art binder compositions that eschew formaldehyde-releasing polymers frequently lead to textile sheet products of insufficient strength, in particular insufficient wet tensile strength.

SUMMARY OF THE INVENTION

The problem addressed by the present invention against this background was that of providing binder compositions useful in the manufacture of textile sheet products and capable of reducing or entirely avoiding one or more of the prior art disadvantages referred to above.

The invention provides for the use of binder compositions comprising one or more polymers based on ethylenically unsaturated monomers in the manufacture of textile sheet products, characterized in that the polymers are based on a) 0.1 to 10 wt % of one or more ethylenically unsaturated monomers comprising epoxy groups, b) 0.1 to 10 wt % of one or more ethylenically unsaturated monomers comprising silane groups, and c) one or more further ethylenically unsaturated monomers other than said monomers a) and b), wherein the particulars in wt % are each based on the total weight of the polymers.

DETAILED DESCRIPTION OF THE INVENTION

Examples of ethylenically unsaturated monomers a), comprising epoxy groups, are 4-hydroxybutyl acrylate glycidyl ether, 4-hydroxybutyl methacrylate glycidyl ether, allyl glycidyl ether, and in particular glycidyl methacrylate or glycidyl acrylate.

The polymers are based with preference on 0.1 to 10 wt %, with particular preference on 0.5 to 7 wt %, with more preference on 0.5 to 5 wt % and with most preference on 1 to 5 wt % of monomers a), each based on the total weight of the polymers.

Examples of ethylenically unsaturated monomers b), comprising silane groups, are compounds of the general formula $R^1SiR^2_{0-2}(OR^3)_{1-3}$, wherein $R^2$ is a $C_1$- to $C_3$-alkyl moiety, $C_1$- to $C_3$-alkoxy moiety or halogen, for example chlorine or bromine, $R^1$ has the meaning $CH_2=CR^4-(CH_2)_{0-1}$ or $CH_2=CR^4CO_2(CH_2)_{1-3}$ with $R^4$ as carbyl moiety of 1 to 10 carbon atoms, $R^3$ is a branched or unbranched, substituted or unsubstituted alkyl moiety of 1 to 12 carbon atoms, preferably 1 to 3 carbon atoms. The silicon atom Si, as will be known, is tetravalent therein.

Preference is given to γ-acryloyl- or γ-methacryloyloxypropyl-tri(alkoxy)silanes, α-methacryloyloxymethyltri(alkoxy)silanes, γ-methacryloyloxypropylmethyldi(alkoxy)silanes, vinylalkyl-di(alkoxy)silanes and vinyltri(alkoxy)silanes, where useful alkoxy groups include, for example, methoxy, ethoxy, isopropoxy, methoxyethylene, ethoxyethylene, methoxypropylene glycol ether and/or ethoxypropylene glycol ether moieties. Preferred monomers b) further include vinyltrimethoxysilane, vinylmethyldimethoxysilane, vinyltriethoxysilane, vinylmethyldiethoxysilane, vinyltripropoxy-silane, vinyltriisopropoxysilane, vinyltris (1-methoxy)isopropoxy-silane, vinyltributoxysilane, 3-methacryloyloxypropyltrimethoxy-silane, 3-methacryloyloxypropylmethyldimethoxysilane, methacryloyl-oxymethyltrimethoxysilane, 3-methacryloyloxypropyltris(2-methoxyeth-oxy)silane, vinyltris(2-methoxyethoxy)silane, allylvinyl-trimethoxysilane, allyltrimethoxysilane, vinyldimethylmethoxysilane, vinyldimethylethoxysilane, vinylisobutyldimethoxysilane, vinyltriisopropyloxysilane, vinyltributoxysilane, vinyltrihexyloxysilane, vinylmethoxydihexyloxysilane, vinyltrioctyloxysilane, vinyldimethoxyoctyloxysilane, vinylmethoxydioctyloxysilane, vinylmethoxydilauryloxysilane and vinyldimethoxylauryloxysilane.

Particularly preferred unsaturated alkoxysilanes are vinyltrimethoxysilane, vinylmethyldimethoxysilane, vinyltriethoxy-silane, vinyltriisopropoxysilane, vinylmethyldiethoxysilane, vinyltris(1-methoxy)isopropoxysilane, methacryloyloxypropyltris(2-methoxyethoxy)silane, 3-methacryloyloxypropyltrimethoxysilane, 3-methacryloyloxypropylmethyldimethoxysilane and methacryloyl-oxymethyltrimethoxysilane.

Vinylsilanes, i.e., silanes comprising vinyl groups, are altogether preferable.

The polymers are based with preference on 0.1 to 10 wt %, with particular preference on 0.3 to 7 wt %, with more preference on 0.5 to 5 wt % and with most preference on 1 to 5 wt % of monomers b), each based on the total weight of the polymers.

The further ethylenically unsaturated monomers c) other than monomers a) and b) are selectable, for example, from the group comprising vinyl esters, (meth)acrylic esters, vinylaromatics, olefins, 1,3-dienes and vinyl halides and optionally further monomers copolymerizable therewith.

Suitable vinyl esters include, for example, vinyl esters of carboxylic acids having 1 to 22 carbon atoms, in particular 1 to 12 carbon atoms. Preference is given to vinyl acetate, vinyl propionate, vinyl butyrate, vinyl 2-ethylhexanoate, vinyl laurate, vinyl myristate, vinyl palmitate, vinyl stearate, vinyl arachinate, 1-methylvinyl acetate, vinyl pivalate and vinyl esters of α-branched monocarboxylic acids having 9 to 11 carbon atoms, for example VeoVa9$^R$ or VeoVa10$^R$ (trade names of Resolution). Vinyl acetate is particularly preferable.

Suitable acrylic esters or methacrylic esters are, for example, esters of branched or unbranched alcohols having 1 to 22 carbon atoms, in particular 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate, lauryl acrylate, myristyl acrylate, stearyl acrylate, palmityl acrylate, lauryl methacrylate, myristyl methacrylate, stearyl methacrylate or palmityl methacrylate. Particular preference is given to methyl acrylate, methyl methacrylate, n-butyl acrylate, t-butyl acrylate or 2-ethylhexyl acrylate.

Preferred vinylaromatics are styrene, methylstyrene and vinyltoluene. The preferred vinyl halide is vinyl chloride. The preferred olefins are ethylene, propylene and the preferred dienes are 1,3-butadiene or isoprene.

The polymers are based with preference on 70 to 99.8 wt %, with particular preference on 80 to 99 wt % and with most preference on 90 to 97 wt % of monomers c), each based on the total weight of the polymers.

Preference is also given to the additional copolymerizing of one or more further monomers d) selected from the group comprising ethylenically unsaturated sulfonated monomers or salts thereof, in particular their sodium salts, and ethylenically unsaturated carboxamides. As between these, the preference is for ethylenically unsaturated sulfonated monomers d). Examples of ethylenically unsaturated sulfonated monomers are 2-acrylamido-2-methyl-propanesulfonic acid, 2-methylprop-2-ene-1-sulfonic acid and, in particular, vinylsulfonic acid. Examples of ethylenically unsaturated carboxamides are acrylamide, methacrylamide, itaconamide and crotonamide.

Monomers c) are preferably also other than monomers d). The adhesion of the polymers to the fibers of the textile sheet products may be further improved with monomers c) for example.

The polymers are based with preference on 0 to 25 wt %, with particular preference on 0.2 to 20 wt %, with more preference on 0.2 to 10 wt %, with yet more preference on 0.2 to 5 wt % and with most preference on 0.5 to 5 wt % of monomers d), each based on the total weight of the polymers.

Optionally, an additional 0.1 to 10 wt %, based on the total weight of the monomer mixture, of ancillary monomers may be copolymerized. It is preferable to employ from 0.5 to 5 wt % of ancillary monomers. It is particularly preferable not to employ any ancillary monomers. Examples of ancillary monomers are ethylenically unsaturated mono- and dicarboxylic acids, preferably acrylic acid, methacrylic acid, fumaric acid and maleic acid; ethylenically unsaturated carbonitriles, preferably acrylonitrile; mono- and diesters of fumaric acid and maleic acid such as the diethyl and diisopropyl esters; and also maleic anhydride. Also suitable are monomers having hydroxyl or CO groups, for example methacrylic and acrylic hydroxyalkyl esters such as hydroxyethyl, hydroxypropyl or hydroxy-butyl acrylates or methacrylates, and also compounds such as diacetoneacrylamide or acetylacetoxyethyl acrylate or methacrylate.

Preference is also given to polymers containing no units of monomers comprising hydroxyl, carboxylic acid or carboxylic anhydride groups. Particular preference is given to polymers containing no units of N-methylol(meth)acrylamide. Preferably the polymers also contain no units of N-(alkoxymethyl)(meth)acrylamides, such as N-(isobutoxymethyl)acrylamide (IBMA), N-(isobutoxymethyl)methacrylamide (IBMMA), N-(n-butoxymethyl)acrylamide (NBMA) or N-(n-butoxymethyl)-methacrylamide (NBMMA).

Preference is given to homo- or copolymers containing one or more monomers a), one or more monomers b), one or more monomers c) from the group comprising vinyl acetate, vinyl esters of α-branched monocarboxylic acids having 9 to 11 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, styrene and also, optionally, one or more monomers d).

Greater preference is given to copolymers containing one or more monomers a), one or more monomers b) and as monomers c) vinyl acetate and ethylene; or vinyl acetate, ethylene and a vinyl ester of α-branched monocarboxylic acids having 9 to 11 carbon atoms; vinyl acetate and one or more (meth)acrylic esters of branched or unbranched alcohols having 1 to 15 carbon atoms, in particular methyl acrylate, ethyl acrylate, propyl acrylate, n-butyl acrylate, 2-ethylhexyl acrylate and optionally ethylene; one or more vinyl esters, ethylene and one or more vinyl halides; one or more (meth)acrylic esters of branched or unbranched alcohols having 1 to 15 carbon atoms, such as n-butyl acrylate and 2-ethylhexyl acrylate and/or methyl methacrylate; styrene and one or more monomers from the group methyl acrylate, ethyl acrylate, propyl acrylate, n-butyl acrylate, 2-ethylhexyl acrylate; 1,3-butadiene and styrene and/or methyl methacrylate and also, optionally, further acrylic esters; while the polymers mentioned may optionally further comprise one or more monomers d) and optionally one or more ancillary monomers as mentioned above.

Particular preference is given to vinyl ester copolymers containing one or more monomers a), one or more monomers b) and as monomers c) one or more vinyl esters and 1 to 50 wt % of ethylene; vinyl acetate and 1 to 50 wt % of ethylene and 1 to 50 wt % of one or more comonomers from the group vinyl esters having 1 to 12 carbon atoms in the carboxylic acid moiety such as vinyl propionate, vinyl laurate, vinyl esters of alpha-branched carboxylic acids having 9 to 13 carbon atoms such as VeoVa9, VeoVa10, VeoVa11; one or more vinyl esters, 1 to 50 wt % of ethylene and preferably 1 to 60 wt % of (meth)acrylic esters of branched or unbranched alcohols having 1 to 15 carbon atoms, in particular n-butyl acrylate or 2-ethylhexyl acrylate; 30 to 75 wt % of vinyl acetate, 1 to 30 wt % of vinyl laurate or vinyl esters of an alpha-branched carboxylic acid having 9 to 11 carbon atoms, and also 1 to 30 wt % of (meth)acrylic esters of branched or unbranched alcohols having 1 to 15 carbon atoms, in particular n-butyl acrylate or 2-ethylhexyl acrylate, which further comprise 1 to 40 wt % of ethylene; one or more vinyl esters, 1 to 50 wt % of ethylene and 1 to 60 wt % of vinyl chloride; while the polymers may further comprise one or more monomers d) and optionally the recited ancillary monomers in the recited amounts, and the particulars in wt % add up to 100 wt % in each case.

Particular preference is also given to (meth)acrylic ester polymers containing one or more monomers a), one or more monomers b) and as monomers c) n-butyl acrylate or 2-ethylhexyl acrylate; methyl methacrylate, n-butyl acrylate and/or 2-ethylhexyl acrylate; styrene and one or more monomers from the group methyl acrylate, ethyl acrylate, propyl acrylate, n-butyl acrylate, 2-ethylhexyl acrylate; vinyl acetate and one or more monomers from the group methyl acrylate, ethyl acrylate, propyl acrylate, n-butyl acrylate, 2-ethylhexyl acrylate and optionally ethylene; while the polymers may further comprise one or more monomers d) and optionally the recited ancillary monomers in the recited amounts, and the particulars in wt % add up to 100 wt % in each case.

Most preference is given to copolymers containing one or more monomers a), one or more monomers b) and as monomers c) vinyl acetate and 5 to 50 wt % of ethylene; vinyl acetate, 1 to 50 wt % of ethylene and 1 to 50 wt % of a vinyl ester of α-branched monocarboxylic acids having 9 to 11 carbon atoms; 30 to 75 wt % of vinyl acetate, 1 to 30 wt % of vinyl laurate or vinyl esters of an alpha-branched carboxylic acid having 9 to 11 carbon atoms, and also 1 to 30 wt % of (meth)acrylic esters of branched or unbranched alcohols having 1 to 15 carbon atoms, which further comprise 1 to 40 wt % of ethylene; vinyl acetate, 5 to 50 wt % of ethylene and 1 to 60 wt % of vinyl chloride, while the polymers may further comprise one or more monomers d) in the recited amounts, and the particulars in wt % add up to 100 wt % in each case.

The monomer selection and/or the selection of the weight fractions of the comonomers is made so as to obtain in general a glass transition temperature Tg of $\leq +120°$ C., preferably $-50°$ C. to $+60°$ C., more preferably $-30°$ C. to $+40°$ C. and most preferably $-15°$ C. to $+20°$ C. The glass transition temperature Tg of the polymers is quantifiable in a known manner using differential scanning calorimetry (DSC). The Tg can also be approximately predicted using the Fox equation. After Fox T. G., Bull. Am. Physics Soc. 1, 3, page 123 (1956): $1/Tg = x1/Tg1 + x2/Tg2 + \ldots + xn/Tgn$, where xn is the mass fraction (wt %/100) of the monomer n and Tgn is the glass transition temperature in kelvins of the homopolymer of the monomer n. Tg values of homopolymers are reported in Polymer Handbook 2nd Edition, J. Wiley & Sons, New York (1975).

The polymers are obtainable via free-radically initiated polymerization. The preparation of the polymers may be effected in a manner known per se, for example by the suspension polymerization process or preferably by the emulsion polymerization process in the presence of protective colloids or preferably emulsifiers. The polymerization temperature is generally in the range from 20° C. to 120° C., preferably in the range from 40° C. to 100° C. and most preferably in the range from 50° C. to 80° C. The copolymerization of gaseous comonomers, such as ethylene, is preferably carried out under superatmospheric pressure, in general between 5 bar and 100 bar. The polymerization is generally carried out in an aqueous medium. Molecular weight may be controlled by employing the common chain transfer agents during the polymerization.

The initiation of the polymerization may be effected using the customary water-soluble and/or monomer-soluble initiators or redox initiator combinations for emulsion and/or suspension polymerization. Preferred reducing agents are ascorbic acid, isoascorbic acid or salts thereof, sulfite, sulfinic acid or else sulfinic acid derivatives, also known by the trade name of rueggolit® FF6. Preferred oxidizing agents are persulfate compounds, in particular ammonium or alkali metal persulfates. Preference is further given to employing hydroperoxides, in particular tert-butyl hydroperoxide or hydrogen peroxide, as oxidizing agents. The initiators used are preferably not formaldehyde-releasing substances, such as formaldehydesulfoxylates or Formopon.

The polymerization batch and/or the polymer dispersions may be stabilized using the ionic or nonionic emulsifiers typically used in the emulsion polymerization process. It is preferably up to 6 wt %, more preferably 0.1 up to 5 wt % and most preferably 1 to 4 wt % which is used of one or more emulsifiers, based on the total weight of all the monomers used.

Suitable emulsifiers are for example anionic surfactants, such as alkyl sulfates having a chain length of 8 to 18 carbon atoms, alkyl or alkylaryl ether sulfates having 8 to 18 carbon atoms in the hydrophobic moiety and up to 40 ethylene or propylene oxide units, alkyl or alkylaryl sulfonates having 8 to 18 carbon atoms, oleic acid sulfonates, esters and monoesters of sulfosuccinic acid with monohydric alcohols or alkylphenols. Suitable nonionic surfactants are for example alkyl polyglycol ethers or alkylaryl polyglycol ethers having 8 to 40 ethylene oxide units. The employment of alkyl ether sulfates or dodecylbenzenesulfonates is preferable.

The emulsion polymerization may be carried out in the presence of protective colloids, but is preferably carried out in the absence of protective colloids. Examples of protective colloids are polyvinyl alcohols; polyvinylpyrrolidones; polyvinyl acetals; polysaccharides; synthetic polymers such as poly(meth)acrylic acid, copolymers of (meth)acrylates with carboxyl-functional comonomer units, poly(meth)acrylamide, polyvinylsulfonic acids and water-soluble copolymers thereof; styrene-maleic acid and vinyl ether-maleic acid copolymers.

The polymers are preferably in the form of emulsifier-stabilized aqueous dispersions. Preference is also given to polymers in the form of aqueous dispersions containing no emulsifiers and no protective colloids.

The monomers may be wholly or preferably partly included in the initial charge and any remaining amount of monomers may be added during the polymerization. Monomers c) are preferably part included in the initial charge and part added. Monomers a) and monomers b) are preferably fully added, in particular concurrently, but preferably at separate places. Any monomers d) are preferably fully included in the initial charge, but may also be partly included in the initial charge and partly added. The emulsifiers may be wholly or preferably partly included in the initial charge and any remaining amount of emulsifiers may be added during the polymerization. Preferably, the emulsifiers are fully added.

The polymers in the form of aqueous dispersions generally have a solids content of 35 to 65 wt %, preferably 40 to 60 wt % and more preferably 45 to 55 wt %. The Brookfield viscosity of the aqueous dispersions is preferably from 50 to 2000 mPas, more preferably from 100 to 1500 mPas (as determined with a Brookfield viscometer at 23° C., 20 rpm and a solids content of 49 to 51 wt % for the dispersions).

Volume-average particle size diameters are preferably in the range from 50 to 4000 nm, more preferably from 100 to 500 nm (determined using a Beckmann Coulter® LS 13 320 as per the instrument protocol, by using the optical constants of polyvinyl acetate; the dispersion was diluted with water; the particle size reported herein is the central value of the volume distribution function of the particle diameter×3.50).

The binder compositions may also contain one or more additives, for example emulsifiers, such as fatty alcohol ethoxylates having low degrees of ethoxylation, in particular 2 to 5, or diisotridecyl sulfosuccinate or their salts, such as sodium salts. Typical usage levels of emulsifiers, based on the dry weight of the polymer, range from 0 to 1 wt %, preferably from 0 to 0.6 wt %. Emulsifiers may be used to enhance the hydrophilicity of the textile sheet products endowed with such binder compositions. Further additives are acidic catalysts, such as ammonium chloride, citric acid or sulfuric acid. Acidic catalysts are typically added in amounts of 0 to 2 wt %, preferably 0.1 to 1 wt %, based on the dry weight of the polymer. When Brønsted acids are used as acidic catalysts, they are employed in an amount so as to give a pH of preferably 0 to 4 and more preferably of 2 to 3.

The manufacture of the textile sheet products in the manner of the present invention generally takes the form of fibers being contacted with one or more binder compositions of the present invention, in particular in the form of their aqueous dispersions, and then optionally dried and/or cured.

Drying/curing is preferably carried out at temperatures of ≤160° C., more preferably 120 to 160° C. and most preferably at 140 to 160° C.

The fibers are generally based on natural or synthetic, in particular organic, materials. Examples thereof are manufactured fibers based on fiber-forming polymers such as viscose, polyester, polyamide, polypropylene, polyethylene fibers. Examples of natural fiber materials are wood, wool, cotton, jute, flax, hemp, coir, ramie, sisal and, in particular, cellulose fibers. The fibers are preferably not based on inorganic materials. The fibers are thus preferably not ceramic fibers or mineral fibers and particularly not glass fibers, especially when inorganic fibers quantitatively constitute the major part of the textile sheet product. The fibers may be loose or else in the form of bundles or woven textiles, yarns, or preferably in the form of nonwovens, such as webs, non-crimp fabrics or knitted fabrics other than those formed by weft knitting with independently-movable needles. The nonwovens may optionally be in a thermally or mechanically preconsolidated, for example needled, state.

The fibers may have any lengths, for example lengths from 1 mm to infinite length, preferably 5 mm to 100 mm, more preferably 7 mm to 75 mm and most preferably 10 mm to 60 mm. The fibers may have the usual diameters, preferably diameters of 0.1 µm to 1 mm, more preferably 0.5 µm to 100 µm and most preferably 1 µm to 50 µm.

The textile sheet products are manufactured in the manner of the present invention by employing the polymers in an amount of preferably 1 to 50 wt %, more preferably 10 to 30 wt % and most preferably 15 to 25 wt %, based on the total weight of the fibers. The proportion of fibers is preferably from 40 to 99 wt %, more preferably from 60 to 90 wt % and most preferably from 70 to 80 wt %, based on the total weight of the textile sheet products.

In one possible procedure to manufacture the textile sheet products in the manner of the present invention, the fibers are mixed with the binder compositions and the mixture of fibers and binder compositions is laid down via the customary processes of nonwoven technology, for example by means of an airlay, wetlay, direct spinning or carding apparatus, prior to consolidation. The textile sheet product may then be bonded by raising the temperature, optionally under application of pressure.

In another possible procedure, the fibers are spread out sheetlike prior to consolidation. Processes for this are known and depend primarily on the intended application for the consolidated fibrous material. The fibers may be laid down by means of an airlay, wetlay, direct spinning or carding apparatus for example. Mechanical consolidation, for example by crosslaying, needling or water jet consolidation, may optionally precede the consolidation with binder. Thereafter, the binder composition can be applied into the laid-down fibers, in which case the binder compositions may be applied in areal form, in punctuate form or patternwise into subareas. The fibers are subsequently bondable by application of heat and optionally pressure.

The binder compositions are also useful for producing laminates, in which case two fibrous plies are mutually adhered or one fibrous ply is adhered to a further substrate. This can be done by laying down a fibrous ply after mixing with or before application of the binder composition and laying a further fibrous ply on top, for example by airlaying. Instead of the second fibrous ply, a different substrate may also be placed on top, a plastic film being one example. This is followed by binding under heat and optionally pressure. This procedure makes available, for example, reclaimed cotton insulating materials durably clad with a fiberweb as surfacing material.

The binder compositions are also useful in the manufacture of lofty nonwovens or waddings as used, for example, as semifinished products for the production of moldings from fibrous materials or as padding, cushioning, insulating and filter waddings. To this end, the binder composition can be applied to the fibers and consolidated by heating, preferably in a mold.

The textile sheet products obtained according to the present invention are preferably nonwovens, in particular tissues, felts, waddings or coarse-mesh, loose wovens or knits. The textile sheet products may for example be employed in the automotive sector, for household products, such as tablecloths, hygiene articles, such as toilet paper, in the clothing industry, for medical textiles or geotextiles.

The procedure of the present invention reduces the release of formaldehyde from textile sheet products, in particular by comparison with processes employing polymers comprising N-methylol-acrylamide units or phenol-formaldehyde resins as binders. Even textile sheet products that are essentially free from formaldehyde are obtainable. In addition, the textile sheet products obtained according to the present invention exhibit surprisingly high dry and/or wet strengths and further have the desired water absorption capacity and meet the required water penetration time. The binder compositions of the present invention are also stable in storage. For instance, the viscosity of the binder compositions stored for six months preferably changes by less than 100% even at 40° C. Advantageously, the textile sheet products of the present invention are also more neutral in odor than conventional products employing binders comprising for example sulfite-capped aldehyde functions or capped isocyanates. The procedure of the present invention is a way to completely eliminate the release of toxic substances, so textile sheet products thus obtainable even meet the requirements of food approval authorities.

The examples hereinbelow illustrate the invention.

Raw Materials:

Raw materials employed were all commercially available technical-grade products not subjected to any special pre-treatment. The "water" employed was water demineralized by ion exchange. Solutions are without exception aqueous and their concentration is reported in wt %.

Monomers employed besides vinyl acetate (VAc) were as follows: ethylene (Eth), butyl acrylate (BA), vinylsulfonate as 25% solution (VS), acrylamide as 30% solution (AMD), glycidyl methacrylate (GMA), Geniosil® XL10 (vinyltrimethoxysilane; trade name of Wacker Chemie), Geniosil® GF56 (vinyltriethoxysilane; trade name of Wacker Chemie). Oxidizing agents employed were sodium peroxodisulfate (NPS) or potassium peroxodisulfate (KPS). Reducing agents used were ascorbic acid (Asc) or sodium isoascorbate (NAsc).

The copolymerizations with ethylene were carried out in a 2 L pressurizable reactor designed for operating pressures up to 85 bar and fitted with electronic temperature measurement and control means, a three-step paddle stirrer, a safety valve and five concurrent metering means, operated at 400 rpm. Atmospheric reactions were all carried out in a 2 L glass reactor equipped with reflux condenser and anchor stirrer at a stirrer speed of 200 rpm.

EXAMPLE 1

Bsp.1

The pressurizable reactor was initially charged with 493.5 g of water, 22.9 g of VS and 27.4 g of AMD. Using a 1% formic acid solution, pH 4.0 was established. This was followed by the admixture of 4 g of a 1% solution of ammonium iron(II) sulfate and also of 210 g of vinyl acetate. The batch was temperature regulated to 50° C. and 224 g of Eth were injected. Feed 1, consisting of a 10.44% NPS solution, and also feed 2, a 5% solution of Asc, were each admixed at a metering rate of 15 ml/h at a target temperature of 50° C. Feeds 3 and 4 were commenced 10 min after the start of the reaction and both continued for 180 min. Feed 3 was a mixture of 496 g of vinyl acetate, 10 g of GF56 and 20 g of GMA; it was added at a rate of 187 ml/h. Feed 4 was a mixture of 95.4 g of water, 30.5 g of Disponil FES27 (alkyl ether sulfate C12-14 sodium salt, 28% in water; trade name of BASF) and 68.5 g of acrylamide, adjusted to pH 3.9 with 10% aqueous sodium hydroxide solution and added at a rate of 63.3 ml/h. At the same time, the rate of adding feeds 1 and 2 was raised to 19 ml/h for both. These two feed additions ran for altogether 285 min.

On completion of the addition of feeds 1 and 2, 20 g of a 10% $H_2O_2$ solution were admixed. The pH was adjusted with a 10% aqueous sodium hydroxide solution to pH 4.5, the dispersion was cooled down to room temperature, and the pressurized reactor was let down. Finally, pH 5.5 was established with aqueous sodium hydroxide solution.

EXAMPLE 2

Bsp.2

Example 1 was repeated except that the composition of feed 3 was 446 g of vinyl acetate, 40 g of GF56 and 40 g of GMA and a solution of sodium isoascorbate was employed instead of the ascorbic acid solution.

EXAMPLE 3

Bsp.3

Example 1 was repeated except that the composition of feed 3 was 456 g of vinyl acetate and 5 g of GF56. Feed 3 was added at a rate of 165 ml/h. 10 min after completion of the addition of feed 3, a start was made on adding an additional feed 5, which was composed of 45 g of vinyl acetate and 20 g of GMA. The rate of addition was 200 ml/h.

EXAMPLE 4

Bsp.4

Example 1 was repeated except that the composition of feed 3 was 486 g of vinyl acetate, 30 g of XL10 and 10 g of GMA.

EXAMPLE 5

Bsp.5

Example 3 was repeated except that the composition of feed 3 was 396 g of vinyl acetate and 10 g of XL10 and that of feed 5 was 90 g of vinyl acetate and 30 g of GMA. The metering rates were 125 ml/h for feed 3 and 260 ml/h for feed 5.

EXAMPLE 6

Bsp.6

A 2 L glass flask was initially charged with 8.1 g of VS, 0.4 g of Disponil FES27 and also 354.1 g of water. Using a 1% formic acid solution, pH 4.0 was established, followed by the admixture of 67.8 g of VAc, 7.6 g of BA and 2.8 g of a 1% solution of ammonium iron(II) sulfate. The batch was temperature regulated to 60° C. and on attainment of the target temperature feeds 1 and 2 were started at rates of 21 ml/h each. Feed 1 consisted of a 3% solution of potassium persulfate and feed 2 of a 1.7% solution of ascorbic acid. Both feeds ran for 315 min.

15 min after feed 1, feed 3 was started and left to run at a rate of 223 ml/h for 240 min. This feed consisted of 78.9 g of BA, 709.0 g of VAc, 22.7 g of GMA and 22.7 g of GF56. 5 min after feed 3, feed 4 was started and left to run at a rate of 95.6 ml/h for 230 min. This feed consisted of 20.2 g of Genapol X150 (isotridecyl alcohol ethoxylate having an average degree of ethoxylation of 15, 40% in water, trade name of Clariant), 30.3 g of Disponil FES27 and also 317 g of water. The batch was postpolymerized by admixture of 4 g of a 15% solution of tert-butyl hydroperoxide and also 6 g of a 10% solution of ascorbic acid and then cooled down to room temperature.

EXAMPLE 7

Bsp.7

Example 6 was repeated except that feed 3 consisted of 78.9 g of BA, 587.0 g of VAc and 4.5 g of XL10 and was added at a rate of 240 ml/h for 200 min. 10 min after completion of feed 3, a feed 5 was started. It ran for 30 min at a rate of 350 ml/h and was composed of 122 g of VAc and 40.9 g of GMA.

COMPARATIVE EXAMPLE 1

VBsp.1

Example 1 was repeated except that feed 3 consisted of 506 g of vinyl acetate and 20 g of GMA.

COMPARATIVE EXAMPLE 2

VBsp.2

Example 3 was repeated except that feed 3 consisted of 461 g of vinyl acetate.

COMPARATIVE EXAMPLE 3

VBsp.3

Example 1 was repeated except that feed 3 consisted of 516 g of vinyl acetate and 10 g of GF56.

COMPARATIVE EXAMPLE 4

VBsp.4

Primal™1845K aqueous dispersion from DOW Chemical was employed. The strengths of tissue webs bonded therewith were determined in duplicate, the strengths of airlaid webs bonded therewith were determined in triplicate, and the results obtained were averaged in each case.

Test Methods To Characterize Bonded Nonwovens:

The bonding power of the polymer dispersions described was comparatively characterized separately on two different, pulp-containing and non-woven textile sheet products. In some cases, the polymer dispersions were adjusted to pH 2.5, as reported in table 1. Sulfuric acid was added for this.

Determination of Strength Values for Tissue Nonwovens:

Typical tissue paper (100% pulp; 26 g/m$^2$; dry strength: 3.7 N/45 mm; wet strength: 0.9 N/45 mm; containing 2 ppm of formaldehyde) was homogeneously impregnated, in the nip of a Mathis HVF pad-mangle (from Mathis/CH), with a liquor prepared by diluting the particular (comparative) example polymer dispersion to a solids content of 30% with water and in a laboratory through-air dryer (from Fleissner; 3 min/150° C.) dried and crosslinked. The corresponding binder add-ons were determined gravimetrically following 24 h in a standard atmosphere (ISO 139; 2005; 23±2° C.; 50±3%).

To determine the corresponding breaking strengths, 15 strips 15±1 mm wide and 150±15 mm long were removed in the transverse direction from each web. Of the 15 web strips, 3 at a time were stapled together to form one sample for measurement and altogether n=5 measurement samples were subjected to a breaking strength determination.

Breaking strengths were all determined similarly to DIN EN 29073 (Part 3: Test Methods for Nonwovens, 1992) and the measurement samples for determining the dry breaking strength were determined using an ultimate tensile force measurement on a Zwick® 1445 tester (100 N load cell) with TestXpert® software version 11.02 (from Zwick Roell) in the dry state ("dry") at a clamped length of 100±1 mm, a clamped width of 15±1 mm and a deformation speed of 100 mm/min. To determine the wet breaking strengths ("wet"), the strip samples were stored beforehand in water for 1 min and then determined as described above. The results of the testing are listed in the columns "dry" and "wet" in table 1 under Tissue nonwovens.

Determination of Strength Values for Airlaid Nonwovens:

A thermally prebonded airlaid web (75 g/m$^2$; 88% fluff pulp and 12% PP/PE bicomponent fibers; 0.85 mm thickness, dry strength 500 g/5 cm; wet strength 300 g/5 cm) was homogeneously sprayed on both sides with the particular (comparative) example polymer dispersion diluted with water to a solids content of 20%, using the airless process (Unijet 8001 E slot nozzles; 5 bar) to apply a sprayable liquor using a semiautomatic spraying assembly, and then dried in a laboratory through-air dryer (Mathis LTF; from Mathis/CH) at 160° C. for 3 min. For each breaking strength test, 10 web strips (20 cm clamped length; 5 cm clamped length) were prepared in the cross direction to the machine direction and subjected to an ultimate tensile force measurement at a deformation speed of 150 mm/min as described above for tissue nonwovens. The results of the testing are listed in the columns "dry" and "wet" in table 1 under Airlaid nonwovens.

Determination of Droplet Penetration Time (TEZ) for Tissue Nonwovens:

The TEZ droplet penetration time is measured to evaluate the hydrophilicity/hydrophobicity of the filmed polymer on a fibrous substrate (ability to be wetted by water).

The particular tissue nonwoven was placed on a "Tempo" brand handkerchief folded fourfold (to function as an absorbent core). A perforated stainless steel mask (d=14 cm, 1 cm thick) having five round holes (d=3 cm) was then placed on the corresponding web sample. Using a plastic pipette, 1 droplet of a blue ink (prepared from 1 g of Patentblau V (trade name of Caesar & Loretz) in one liter of distilled water) was applied from a height of 1 cm through every one of the five holes and the time [s] for the droplet to fully penetrate through the tissue nonwoven was captured with a stopwatch. The test was discontinued on reaching 300 s. For each side of the web, 10 individual measurements were carried out in each case and appropriately averaged or in the case of hydrophobic binders recorded as >300 s. The results of the testing are shown in table 1.

Determination of Relative Water Absorbence ("Capacity") for Airlaid Nonwovens:

To evaluate relative water absorbence, which is a measure of the hydrophilicity/hydrophobicity of the polymer binder on the fibers, a stencil was used to cut three specimens sized 4 times 4 cm out of each of the airlaid nonwovens. To determine the water absorbence, the particular specimen was touched with one edge into a water reservoir on a precision scale in a Krüss K12 tensiometer. The weight of water absorbed due to capillary suction was continually measured and plotted in a diagram as mass/time (Krüss LabDesk 2.5. Software sorption method).

The absorbed quantity of water in grams (g) corresponds to the water absorption capacity (hereinafter shortened to capacity) of the airlaid nonwoven and is read off in a mass (g) versus time (s) plot at 180 s. The results of the testing are shown in table 1.

TABLE 1

Test results for tissue and airlaid nonwovens:

| 1 | 2 | 3 | 4 | 5 | 6 | 7 | 8 |
|---|---|---|---|---|---|---|---|
| | | Tissue nonwovens | | | Airlaid nonwovens | | |
| Polymer dispersion | pH | dry % | wet % | TEZ s | dry % | wet % | capacity g |
| VBsp.1 | 5.7 | 100 | 100 | 1 | 100 | 100 | 1.79 |
| | 2.5 | 103 | 101 | 1 | 114 | 103 | 1.87 |
| VBsp.2 | 5.3 | 105 | 100 | 3 | 102 | 98 | 1.67 |
| VBsp.3 | 5.6 | 95 | 90 | 6 | 90 | 90 | 1.45 |
| | 2.5 | 93 | 85 | 4 | 85 | 88 | 1.53 |
| VBsp.4 | 4.2 | 104 | 145 | >300 | 110 | 140 | 0.10 |
| Bsp.1 | 5.6 | 103 | 150 | 5 | 111 | 148 | 1.21 |
| | 2.5 | 107 | 158 | 3 | 115 | 137 | 1.62 |
| Bsp.2 | 5.3 | 100 | 160 | 1 | 107 | 150 | 1.98 |
| Bsp.3 | 5.5 | 100 | 145 | 2 | 113 | 139 | 1.77 |
| | 2.5 | 107 | 168 | 1 | 122 | 158 | 1.90 |
| Bsp.4 | 5.7 | 95 | 122 | 7 | 103 | 133 | 1.40 |
| Bsp.5 | 5.5 | 105 | 168 | 2 | 112 | 162 | 1.73 |
| | 2.5 | 105 | 155 | 1 | 106 | 155 | 1.94 |
| Bsp.6 | 4.3 | 122 | 150 | 7 | 117 | 134 | 1.40 |
| Bsp.7 | 4.1 | 120 | 163 | 4 | 116 | 156 | 1.82 |

Legend to table 1:
column 1: dispersion used of Examples 1 to 7 and of Comparative Examples 1 to 4,
column 2: liquor pH,
column 3: tissue web dry strength in %, based on the strength value of Comparative Example 1,
column 4: tissue web wet strength in %, based on the strength value of Comparative Example 1,
column 5: droplet penetration time into bonded tissue web in seconds,
column 6: airlaid web dry strength in %, based on the strength value of Comparative Example 1,
column 7: airlaid web wet strength in %, based on the strength value of Comparative Example 1,
column 8: water absorption capacity of bonded airlaid nonwoven in grams.

What is claimed is:

1. A method of using binder compositions in the manufacture of textile sheet products,
    comprising contacting fibers based on natural or synthetic, organic materials with one or more binder compositions comprising one or more polymers based on ethylenically unsaturated monomers, and then optionally drying and/or curing the resulting product,
    wherein the one or more polymers are based on ethylenically unsaturated monomers consisting of
    a) 0.1 to 10 wt % of one or more ethylenically unsaturated monomers comprising epoxy groups,
    b) 0.1 to 10 wt % of one or more ethylenically unsaturated monomers comprising silane groups, and
    c) one or more further ethylenically unsaturated monomers, other than said monomers a) and b), selected from the group consisting of vinyl esters, (meth)acrylic esters, vinylaromatics, olefins, 1,3-dienes and vinyl halides, and
    optionally d) one or more further monomers selected from the group consisting of ethylenically unsaturated sulfonated monomers or their salts and ethylenically unsaturated carboxamides and
    optionally 0.1 to 10 wt % of ancillary monomers selected from the group consisting of ethylenically unsaturated mono- and dicarboxylic acids, mono- and diesters of fumaric acid and maleic acid, monomers having hydroxyl or CO groups, diacetoneacrylamide, and acetylacetoxyethyl acrylate or methacrylate,
    wherein the amounts in wt % are each based on the total weight of the polymers.

2. The method as claimed in claim 1, wherein the one or more polymers based on ethylenically unsaturated monomers are in the form of emulsifier-stabilized aqueous dispersions and are obtained via free-radically initiated emulsion polymerization processes in the presence of emulsifiers and in the absence of protective colloids.

3. The method as claimed in claim 1, wherein one or more ethylenically unsaturated monomers a), comprising epoxy groups, are selected from the group consisting of 4-hydroxybutyl acrylate glycidyl ether, 4-hydroxybutyl methacrylate glycidyl ether, allyl glycidyl ether, glycidyl methacrylate and glycidyl acrylate.

4. The method as claimed in claim 1, wherein one or more compounds of the general formula $R^1SiR^2{}_{0-2}(OR^3)_{1-3}$ are selected as ethylenically unsaturated monomers b), comprising silane groups,
    wherein $R^2$ is a $C_1$- to $C_3$-alkyl moiety, $C_1$- to $C_3$-alkoxy moiety or halogen, $R^1$ has the meaning $CH_2=CR^4-(CH_2)_{0-1}$ or $CH_2=CR^4CO_2(CH_2)_{1-3}$ with $R^4$ as carbyl moiety of 1 to 10 carbon atoms, $R^3$ is a branched or unbranched, substituted or unsubstituted alkyl moiety of 1 to 12 carbon atoms.

5. The method as claimed in claim 1, wherein one or more ethylenically unsaturated monomers b), comprising silane groups, are selected from the group consisting of vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy)isopropoxysilane, vinyltributoxysilane, 3-methacryloyloxypropyltrimethoxysilane, 3-methacryloyloxypropylmethyldimethoxysilane, methacryloyloxymethyltrimethoxysilane, 3-methacryloyloxypropyltris(2-methoxyethoxy)silane, vinyltris(2-methoxyethoxy)silane, allylvinyltrimethoxysilane, allyltrimethoxysilane, vinyldimethylmethoxysilane, vinyldimethylethoxysilane, vinylisobutyldimethoxysilane, vinyltriisopropyloxysilane, vinyltributoxysilane, vinyltrihexyloxysilane, vinylmethoxydihexyloxysilane, vinyltrioctyloxysilane, vinyldimethoxyoctyloxysilane, vinylmethoxydioctyloxysilane, vinylmethoxydilauryloxysilane, vinyldimethoxylauryloxysilane, γ-(meth)acryloyloxypropyltri(alkoxy)silanes, α-methacryloyloxymethyltri(alkoxy)silanes, γ-methacryloyloxypropylmethyldi(alkoxy)silanes, vinylalkyldi(alkoxy)silanes and vinyltri(alkoxy)silanes.

6. The method as claimed in claim 1, wherein the one or more polymers are in the form of aqueous dispersions.

7. The method as claimed in claim 1, wherein the fibers are loose or in the form of bundles or woven textiles, or in the form of yarns, nonwovens, such as webs, non-crimp fabrics or knitted fabrics other than those formed by weft knitting with independently-movable needles.

8. The method as claimed in claim 1, wherein the one or more polymers are employed in an amount of 1 to 50 wt %, based on the total weight of the fibers.

9. The method as claimed in claim 1, wherein the proportion of fibers is from 40 to 99 wt %, based on the total weight of the textile sheet products.

10. The method as claimed in claim 5, wherein the term "alkoxy" denotes a moiety selected from the group consisting of methoxy, ethoxy, isopropoxy, methoxyethylene, ethoxyethylene, methoxypropylene glycol ether, and/or ethoxypropylene glycol ether moieties.

\* \* \* \* \*